United States Patent
Kaufhold et al.

(10) Patent No.: US 6,420,510 B1
(45) Date of Patent: Jul. 16, 2002

(54) ALIPHATIC, LOW-EMISSION THERMOPLASTIC POLYURETHANE MOLDING MATERIALS SUITABLE FOR SINTERING

(75) Inventors: Wolfgang Kaufhold, Köln; Hans-Georg Hoppe, Leichlingen; Herbert Heidingsfeld, Frechen; Rainer Ohlinger, Hannover; Michael Kalbe, Limburg, all of (DE)

(73) Assignees: Bayer Aktiengesellschaft, Leverkusen; Benecke-Kaliko AG, Hannover, both of (DE)

( * ) Notice: Subject to any disclaimer, the term of this patent is extended or adjusted under 35 U.S.C. 154(b) by 0 days.

(21) Appl. No.: 09/581,771

(22) PCT Filed: Dec. 10, 1998

(86) PCT No.: PCT/EP98/08043

§ 371 (c)(1),
(2), (4) Date: Jun. 16, 2000

(87) PCT Pub. No.: WO99/33895

PCT Pub. Date: Jul. 8, 1999

(30) Foreign Application Priority Data

Dec. 23, 1997 (DE) ......................... 197 57 569

(51) Int. Cl.⁷ ..................... C08G 18/42; C08G 18/44; C08G 18/32; C08G 18/73; C08G 18/82

(52) U.S. Cl. ..................... 528/80; 528/83; 528/85; 528/481; 528/483

(58) Field of Search ............... 528/80, 83, 85, 528/481, 483

(56) References Cited

U.S. PATENT DOCUMENTS

| | | | |
|---|---|---|---|
| 3,509,233 A | * 4/1970 | Muller et al. | 528/68 |
| 3,541,183 A | 11/1970 | Kallert et al. | 528/68 |
| 4,174,436 A | 11/1979 | Korlatzhi et al. | 528/80 |
| 4,600,653 A | * 7/1986 | Washita et al. | 428/425.6 |
| 4,931,486 A | * 6/1990 | Myers | 521/159 |
| 5,210,127 A | * 5/1993 | Werner et al. | 524/589 |
| 5,218,058 A | * 6/1993 | Zeitler et al. | 525/453 |
| 5,252,683 A | * 10/1993 | Murata et al. | 525/458 |
| 5,541,277 A | * 7/1996 | Muhlfeld et al. | 528/28 |
| 5,695,884 A | 12/1997 | Ishimaru et al. | 428/423.1 |
| 6,166,135 A | * 12/2000 | Kaufhold et al. | 525/123 |

FOREIGN PATENT DOCUMENTS

| | | |
|---|---|---|
| DE | 2658138 | 6/1978 |
| DE | 2901774 | 7/1980 |
| DE | 3932923 | 4/1991 |
| DE | 4203307 | 12/1992 |
| DE | 4209709 | 9/1993 |

* cited by examiner

*Primary Examiner*—Rabon Sergent
(74) *Attorney, Agent, or Firm*—Joseph C. Gil; Aron Preis; James R. Franks

(57) ABSTRACT

Polyurethane moulding compositions which can be melt processed in the form of sintering powders suitable for the preparation of grained sintered films and which are prepared exclusively from linear aliphatic components are described. The polyol component is composed of 30 to 80 parts by weight of an aliphatic polycarbonate diol with an average molecular weight $\bar{M}_n$ of 1000 to 2200 and 70 to 20 parts by weight of a polybutane diol adipate and/or a polycaprolactone diol with an average molecular weight $\bar{M}_n$ of 1000 to 2400. Moreover, the mixture contains 1,6-hexamethylene diisocyanate in an equivalence ratio of 2.3:1.0 to 6.2:1.0, based on the polyol mixture and butane-1,4-diol as chain extender, the equivalence ratio of the butane-1,4-diol based on the poly mixture being 1.3:1.0 to 5.2:1.0.

9 Claims, No Drawings

ALIPHATIC, LOW-EMISSION THERMOPLASTIC POLYURETHANE MOLDING MATERIALS SUITABLE FOR SINTERING

Polyurethane moulding compositions which can be melt processed in the form of sintering powders suitable for the preparation of sintered films and which are prepared exclusively from linear, aliphatic components are described. The polyol component is composed of 30 to 80 parts by weight of an aliphatic polycarbonate diol with an average molecular weight $\overline{M}_n$ of 1000 to 2200 and 70 to 20 parts by weight of a polybutane diol adipate and/or a polycaprolactone diol with an average molecular weight $\overline{M}_n$ of 1000 to 2400. Moreover, the mixture contains 1,6-hexamethylene diisocyanate in an equivalence ratio of 2.3:1.0 to 6.2:1.0, based on the polyol mixture and butane-1,4-diol as the chain extender, the equivalence ratio of the butane-1,4-diol based on the poly mixture being 1.3:1.0 to 5.2:1.0.

The NCO characteristic, formed from the quotient, multiplied by 100, of the equivalence ratios of isocyanate groups and the sum of the hydroxyl groups of polyols and chain extender, is 96 to 99.

Grained sintered films are used for the surface trim of dashboards in motor vehicles and have been produced hitherto from polyvinyl chloride, of which the chlorine content and heavy metal proportion and plasticiser content cause problems during recycling and during use in the motor vehicle. It is known, for example, that plasticisers release gases in sunlight, a fact which becomes apparent in a troublesome film on the interior of the windscreen.

The commercially available, thermoplastic polyurethanes that are used for the production of synthetic leather and also in extrusion and injection moulding processes are suitable for melt processing by the sintering powder process, but the light and temperature stability in particular of the films obtained do not meet the requirements that the automobile industry expects of films for dashboards.

Aromatic, thermoplastic polyurethanes are not light stable due to their aromatic diisocyanate constitution. In the case of light colours, considerable yellowing is brought about by the action of light, and even black films undergo a change in colour and gloss.

DE-AS 16 94 135 describes a process for the preparation of crosslinked polyurethanes from relatively high molecular weight, linear polyhydroxyl compounds which consist of a mixture of 70 to 90 wt. % of hexane diol polycarbonate which has been prepared by reaction of hexane-1,6-diol and diaryl carbonates, and 10 to 30 wt. % of mixed polyester of i.a. adipic acid, hexane-1,6-diol and 2,2'-dimethylpropane-1,3-diol diisocyanates and low molecular weight chain extender containing at least two hydrogen atoms reacting with isocyanate groups, for example, butane-1,4-diol. Exclusively aromatic diisocyanates are to be used. The crosslinking of the polyurethanes is achieved by the use of an excess of diisocyanates. In polyurethane elastomers prepared from these starting materials, the high resistance to hydrolysis caused by the polycarbonate remains intact. Moreover, such elastomers also have improved low temperature resistance and processability compared with the elastomers for the preparation of which pure hexane-1,6-diol polycarbonate was used as the polyol component. The improved processability has particular consequences in the liquid phase - for example, during the casting process-since the polyester-polycarbonate mixtures used have a lower viscosity than the pure hexane diol polycarbonate at the processing temperatures, which is why the resulting film can be cast more easily in a bubble-free manner. The products prepared by this process may be used in mechanical engineering and vehicle construction; no statements are made about their softening range and the heat resistance of their optionally profiled surfaces.

Aliphatic, thermoplastic polyurethanes based on $H_{12}$-MDI are light-fast but their heat resistance is not sufficient for use on dashboards in motor vehicles. In view of intense solar irradiation, the interior of motor vehicles behind the glass windscreen on the dashboard rises to more than 100° C., a temperature which already lies in the softening range of these polyurethanes. Grain stability up to a temperature of 130° C. and hot light stability up to 120° C. cannot be achieved with these materials.

DE-C 42 03 307 describes a polyurethane moulding composition which can be melt processed in the form of a sintering powder for the preparation of grained sintered films, the powder being composed exclusively of linear, aliphatic components. The polyol component is composed of 60 to 80 parts by weight of an aliphatic polycarbonate diol with a molecular weight $\overline{M}_n$ of 2000 and 40 to 20 parts by weight of a polydiol based on adipic acid, hexane diol and neopentyl glycol with a molecular weight $\overline{M}_n$ of 2000. Moreover, the mixture contains 1,6-hexamethylene diisocyanate in an equivalence ratio of 2.8:1.0 to 4.2:1.0 based on the polyol mixture and butane-1,4-diol as chain extender, the equivalence ratio of the butane-1,4-diol based on the poly mixture being 1.3:1.0 to 3.3:1.0. This moulding composition has the disadvantage that the fogging behaviour does not comply with the guidelines of some automobile manufacturers.

The object of the present invention was, therefore, to find a polyurethane moulding composition which can be melt processed as a sintering powder which meets the requirements of motor vehicle manufacturers for plastics in the dashboard area and consequently has the following properties:

soft and leather-like handle;
light fastness, i.e. no yellowing under the action of light and no change in the gloss;
grain stability at temperatures up to 130° C. and hot light stability up to 120° C.;
softening range above 140° C.;
well defined melting point;
low-viscosity melt from the very melting point onwards;
high tensile strength;
tear and tear propagation resistance;
less release of low molecular weight and condensable compounds than is the case with polyurethane moulding compositions according to the state of the art;
good adhesion with the polyurethane backing foam of the instrument panel bodies.

The object according to the invention is achieved by providing a thermoplastic polyurethane moulding composition which can be processed in the form of sintering powder, which moulding composition is obtained by reaction of 100 parts by weight of a polyol mixture of
30 to 80 parts by weight of an aliphatic polycarbonate diol with an average molecular weight $\overline{M}_n$ of 1000 to 2200, preferably 1000 to 2200, and
70 to 20 parts by weight of a polybutane diol adipate or a polycaprolactone diol with an average molecular weight $\overline{M}_n$ of 1000 to 2400, preferably 1800 to 2400, and
1,6-hexamethylene diisocyanate in an equivalence ratio of 2.3:1.0 to 6.2:1.0, based on the polyol mixture, and butane-1,4-diol as chain extender in an equivalence ratio of 1.3:1.0 to 5.2:1.0, based on the polyol mixture, wherein the NCO characteristic, formed from the quotient, multiplied by 100, of the equivalence ratios of isocyanate groups and the sum of the hydroxyl groups of polyol mixture and chain extender, is 96 to 99.

The polyurethane moulding composition is prepared exclusively from aliphatic components, namely 100 parts by weight of a polyol mixture of 30 to 80 parts by weight of an aliphatic polycarbonate diol with an OH value of 112.2 to 51, corresponding to an average molecular weight $\overline{M}_n$ of 1000 to 2200, preferably an OH value of 62.3 to 51, corresponding to an average molecular weight $\overline{M}_n$ of 1800 to 2200, 70 to 20 parts by weight of a polybutane diol adipate or a polycaprolactone diol, in each case with an OH value of 112.2 to 46.7, corresponding to an average molecular weight $\overline{M}_n$ of 1000 to 2400, preferably an OH value of 62.3 to 46.7, corresponding to an average molecular weight $\overline{M}_n$ of 1800 to 2400, 1,6-hexamethylene diisocyanate in an equivalence ratio of 2.3:1.0 to 6.2:1.0, based on the polyol mixture, and butane-1,4-diol as chain extender in an equivalence ratio of 1.3:1.0 to 5.2:1.0, based on the polyol mixture.

The NCO characteristic, formed from the quotient, multiplied by 100, of the equivalence ratios of isocyanate groups and the sum of the hydroxyl groups of polyol mixture and chain extender, is 96 to 99, which means a deficient amount of diisocyanate.

The polybutane diol adipate is the hydroxyl-containing polymerisation product of butane diol and adipic acid, and the polycaprolactone diol is the hydroxyl-containing polymerisation product of caprolactone.

Preferably, a catalyst is used during the continuous preparation of the polyurethane moulding compositions according to the invention according to the extruder or strip process. Suitable catalysts are conventional tertiary amines known from the state of the art such as, e.g. triethylamine, dimethylcyclohexylamine, N-methylmorpholine, N,N'-dimethylpiperazine, 2-(dimethylaminoethoxy)ethanol, diazabicyclo [2,2,2] octane and the like, and particularly organic metal compounds such as titanic acid esters, iron compounds, tin compounds, e.g. tin diacetate, tin dioctoate, tin dilaurate or the tin dialkyl salts of aliphatic carboxylic acids such as dibutyltin diacetate, dibutyltin dilaurate or the like. Preferred catalysts are organic metal compounds, particularly titanic acid esters, iron or tin compounds. Tin dioctoate and dibutyltin dilaurate are more particularly preferred.

The polyurethane moulding compositions according to the invention do not contain any plasticisers at all. Apart from the TPU components and optionally catalysts, other auxiliaries and additives may also be added. Examples include lubricants such as fatty acid esters, the metal soaps thereof, fatty acid amides and silicone compounds, antiblocking agents, inhibitors, stabilisers in respect of hydrolysis, light, heat and discoloration, flame retardants, dyes, pigments, inorganic and organic fillers and reinforcing agents which are prepared according to the state of the art and may also be sized. Further details on the auxiliaries and additives mentioned can be obtained from the specialist literature, for example, J. H. Saunders, K. C. Frisch: "High Polymers", volume XVI, Polyurethane, Part 1 and 2, Interscience Publishers 1962 and 1964 resp., R. Gächter, H. M üller (Ed.): Taschenbuch der Kunststoff-Additive, 3rd edition, Hanser Verlag, Munich 1989 or DE-A-29 01 774.

The fogging behaviour and the condensate formation of thermoplastic polyurethane moulding compositions may be improved considerably by passing hot gas (e.g. air or nitrogen) through the granules of the moulding compositions. The granules are usually treated for 5 to 20 h at temperatures from 80 to 110° C. As a result of this measure, the quantities of condensate determined according to DIN 75 201 (16 h at 120° C.) are less than 1.5 mg/10 g.

The moulding compositions according to the invention are suitable for the preparation of various moulded articles, for example, films, particularly grained sintered films. The polyurethane moulding compositions according to the invention may be sintered in powder form according to the well known "powder-slush process" in heated moulds to form skins. The powder required for this is obtained from the granules of the polyurethane moulding composition according to the invention by cold grinding. The ground material is introduced into the heated mould open on one side, and sintered on the inner wall of the heated surface within a short period. After the mould has been cooled, the slush-skin can be removed. The process is thus similar to that used for the production of dashboard coverings made of PVC skins. It is described in particular in, for example, DE-A-39 32 923 as the "powder-slush process".

On account of the well defined melting point at 180° C. and the presence of a low viscosity melt from the very melting point onwards, the powder sinters on the inner wall of the heated mould within only a short time to form a homogeneous film free from small holes and bubbles and which, in view of the high crystallisation propensity of the moulding composition according to the invention, may be formed without distortion after cooling to only 100° C. All these factors make the sintering process with the moulding composition according to the invention particularly economical.

The sintered film prepared from this polyurethane moulding composition has high tensile strength and outstanding tear and tear propagation resistance. It has a soft and leather-like handle and does not tend to undergo yellowing or a change in gloss under the action of light, even in the case of pale colours.

The grain does not alter during hot light ageing (110 to 120° C.); similarly, no change occurs during heat ageing by storage on a grating at 130° C.

The sintered films prepared from the polyurethane moulding compositions according to the invention are suitable, for example, for use a surface trim in means of transport, e.g. aeroplanes, ships, trains or motor vehicles, particularly as a trim for instrument panels, since the films adhere in an outstanding manner to the polyurethane backing foam of the instrument panel. The present invention also relates, therefore, to the use of the films according to the invention as surface trim for instrument panels in means of transport, particularly in motor vehicles.

EXAMPLES

Example 1

Composition of the mixture:

70.00 parts by weight polycarbonate diol with $\overline{M}_n$=2000

30.00 parts by weight polycaprolactone diol with $\overline{M}_n$=2000

30.10 parts by weight hexamethylene diisocyanate 11.70 parts by weight butane-1,4-diol Method of preparation:

The one-step process was used for preparation. The polycarbonate diol, polycaprolactone diol, hexamethylene diisocyanate and butane-1,4-diol were pre-heated to 90° C., polymerised in an extruder and then granulated. The conventional additives were then added to the granules in a compounding stage and then ground to a fine powder with a particle size distribution of 50 to 400 μm, with cooling with liquid nitrogen.

Example 2

Composition of the mixture:
70.00 parts by weight polycarbonate diol with $\overline{M}_n$=2000
34.00 parts by weight polybutane diol adipate with $\overline{M}_n$=2250
30.20 parts by weight hexamethylene diisocyanate
11.70 parts by weight butane-1,4-diol Method of preparation:

The one-step process was used for preparation. Polycarbonate diol, polybutane diol adipate, hexamethylene diisocyanate and butane-1,4-diol were pre-heated to 90° C., polymerised in an extruder and then granulated. Additives (UV stabilisers, antioxidants, mould release agents) were then added to the granules in a compounding stage and then ground to a fine powder with a particle size distribution of 50 to 500 μm, with cooling with liquid nitrogen.

The material obtained in Example 1 and 2 and a comparison material prepared according to DE-C 42 03 307, Example 1, underwent a fogging test according to DIN 75 201 ("Determination of the fogging behaviour of materials of motor vehicle interior fittings"). Moreover, the residual gloss was determined after three hours conditioning at 100° C. The results are summarized in Table 1.

TABLE 1

|  | Residual gloss (%) | Condensate (mg)* |
|---|---|---|
| Comparative example 1 (acc. to DE-C 42 03 307 | 88 | 4.4 |
| Example 1 | 93 | 3.0 |
| Example 2 | 92 | 2.9 |
| Example 3a |  | 1.4 |
| Example 3b |  | 1.0 |

*The condensable proportion was determined over 16 h at 120° C.

Example 3

TPU granules from Example 2 were exposed to the passage of air at a temperature of 90° C. (stripped).
a) 8 hours at 90° C.
b) 16 hours at 90° C.

The material then underwent a fogging test according to DIN 75 201. The results are reproduced in Table 1.

The results make it clear that the product according to the invention has the residual gloss of >90% required by the motor vehicle industry and releases less condensate than the material according to comparative example 1.

What is claimed is:

1. A sinterable particulate thermoplastic polyurethane molding composition prepared by a method comprising:
    (a) forming a thermoplastic polyurethane by reacting a mixture comprising,
        (i) 100 parts by weight of a polyol mixture consisting essentially of, 30 to 80 parts by weight of an aliphatic polycarbonate diol with an average molecular weight Mn of 1000 to 2200, and 70 to 20 parts by weight of a polybutane diol adipate or a polycaprolactone diol with an average molecular weight Mn of 1000 to 2400,
        (ii) 1,6-hexamethylene diisocyanate in an equivalence ratio of 2.3:1.0 to 6.2:1.0, based on the polyol mixture, and
        (iii) butane-1,4-diol as chan extender in an equivalence ratio of 1.3:1.0 to 5.2:1.0, based on the polyol mixture,
    wherein the NCO characteristic, formed from the quotient, multiplied by 100, of the equivalence ratios of isocyanate groups and the sum of the hydroxyl groups of polyol mixture and chain extender, is 96 to 99;
    (b) grinding the thermoplastic polyurethane of step (a), thereby forming said sinterable particulate thermoplastic polyurethane molding composition; and
    (c) passing a gas having a temperature of from 80° C. to 110° C. through said sinterable particulate thermoplastic polyurethane molding composition,
    wherein said sinterable particulate thermoplastic polyurethane molding composition is free of plasticisers.

2. A process for the continous preparation of the sinterable particulate thermoplastic polyurethane molding composition of claim 1, wherein the formation of the thermoplastic polyurethane of step (a) is carried out in the presence of a catalyst.

3. A molded article comprising the sinterable particulate thermoplastic polyurethane molding composition of claim 1.

4. A film comprising the sinterable particulate thermoplastic polyurethane molding composition of claim 1.

5. The film of claim 4 wherein said film is prepared by a powder-slush molding process.

6. The sinterable particulate thermoplastic polyurethane molding composition of claim 1 wherein said grinding step is performed with cooling with liquid nitrogen.

7. The sinterable particulate thermoplastic polyurethane molding composition of claim 1 wherein said sinterable particulate thermoplastic polyurethane molding composition has a particle size distribution of from 50 to 500 μm.

8. The sinterable particulate thermoplastic polyurethane molding composition of claim 1 wherein said gas of step (c) is selected from one of air and nitrogen, and said gas is passed through said sinterable particulate thermoplastic polyurethane molding composition for a period of from 5 to 20 hours.

9. The sinterable particulate thermoplastic polyurethane molding composition of claim 1 wherein said gas of step (c) is selected from one of air and nitrogen, and said gas is passed through said sinterable particulate thermoplastic polyurethane molding composition for a period of time such that 10 grams of the gas treated sinterable particulate thermoplastic polyurethane molding composition generates less than 1.5 mg of condensate, as determined by holding the gas treated sinterable particulate thermoplastic polyurethane molding composition at a temperature of 120° C. for 16 hours.

* * * * *